Figure 1:
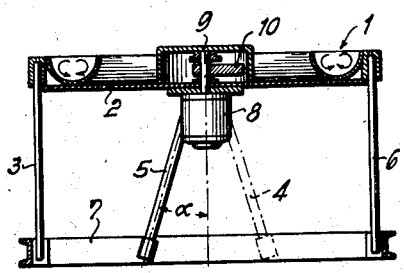

April 14, 1959 H. BEHRENS ET AL 2,882,024
APPARATUS FOR THE VIBRATIONAL TREATMENT OF
MATERIAL OF A NATURE RANGING FROM
GRANULAR TO PULVERULENT NATURE
Filed April 23, 1956

INVENTORS:
Heinz Behrens & Walter Mahlfeldt
By [signature]
Patent Agent

2,882,024

APPARATUS FOR THE VIBRATIONAL TREATMENT OF MATERIAL OF A NATURE RANGING FROM GRANULAR TO PULVERULENT NATURE

Heinz Behrens, Schwarzenfeld, and Walter Mahlfeldt, Hagen, Germany; said Mahlfeldt assignor to Friedrich Uhde G.m.b.H., Dortmund, Germany, a German firm Application April 23, 1956, Serial No. 579,959

Claims priority, application Germany April 23, 1955

11 Claims. (Cl. 259—1)

The invention relates to methods of and apparatus for acting on material, of a nature ranging from granular to pulverulent, by means of vibrations impressed on a carrier for the material.

It is known to convey, turn over and thus treat in desired fashion chemically and/or physically, material the nature of which ranges from granular to pulverulent, such treatment taking place in troughs or channels by means of vibrations impressed on the carrying means for the material.

Apparatus is also known, in which a rotary oscillatory movement is imparted to the carrier for the material with the aid of a magnetic vibrator or an out-of-balance generating means having a horizontal axis of rotation.

It is the object of the invention to provide a method of acting on material of a nature ranging between granular and pulverulent by means of vibrations imparted to the carrier for the material, whereby it is accomplished that the particles of material on the carrier undergo in a comparatively thick layer a rolling movement and in a smaller layer a certain lifting away from the bottom of the carrier.

This object is accomplished by imparting to the carrier a translatory circular motion and, superimposed upon such motion, a tumbling movement.

In carrying out this method it has been found that rolling movements of the material directed from the middle outwards are capable of being produced, the rolling cross-section of which may be compressed to such extent by corresponding action on the vibratory movement that the particles of material wander outwardly whilst being lifted to a certain extent away from the bottom of the carrier. Furthermore, there occurs in the method according to the invention a wandering of the material on the carrier in the direction of a circular path about the vertical centroidal axis of the carrier.

The tumbling movement superimposed on the translatory circular motion, which may be produced, for example, in an extremely simple fashion by means of an out-of-balance generating means, is initiated by displacement forces, which are inclined in relation to the vertical and ensure that the carrier for the material undergoes a tilting movement about the horizontal axis. In addition to the translatory motion the tumbling movement may also be produced by out-of-balance generating means.

The method according to the invention may be carried out by various different kinds of apparatus. One suitable form of apparatus comprises a carrier for the material, an out-of-balance vibration generating means having its axis of rotation disposed at least approximately in the vertical centroidal axis of the carrier, and supports for the carrier which are disposed remote from said carrier axis and are inclined to the vertical and each of which is comparatively rigid in the direction of the line connecting its anchorage and its attachment to the carrier but is arranged for deflection normal to said direction.

Another suitable form of apparatus comprises a resiliently mounted carrier for the material, and an out-of-balance vibration generating means said means having two co-axial angularly offset out-of-balance weights one of which is located nearer than the other to the centre of gravity of the vibrating parts of the apparatus.

In the last mentioned apparatus it is unimportant whether the out-of-balance weights are disposed above or below or above and below the centre of gravity of the vibrating parts.

By varing the circumferential velocity of the out-of-balance weights and/or the effective out-of-balance forces, large variations in the movement of the material on the carrier may be obtained.

These measures may also be assisted by an eccentric and/or inclined arrangement of the axis of rotation of at least one of the out-of-balance weights.

The construction of the carrier itself depends upon the particular use to which the apparatus is to be put. Thus, for example, the carrier may be constructed as a flat plate of preferably circular form, or it may also be formed as a trough, i.e. having a side wall. The carrier may also have a channel-like or tubular form with any desired cross-section for example semi-circular, elliptical or the like, this channel or tubular member may be constructed as a complete spiral and/or helical carrier for the material.

It is furthermore possible to vary the cross-section of the carrier for the material over its length as desired and in accordance with requirements. A plate-like embodiment of the material carrier is particularly suitable if, for example, the apparatus according to the invention is to be employed as bunker closure means. By a sieve-like construction of the material carrier it is possible to employ the method according to the invetnion for screening operations.

An important advantage of the method according to the invention resides in the possibility of combining the different forms of the material carrier, so that in addition to a physical and/or chemical treatment it is also possible at the same time to effect conveyance of the material.

Tests carried out up to now have shown that the method according to the invention can be used inter alia for drying operations, screening, mixing, conveying, separating, grading, thermal treatment, moistening, chemical conversion, etc., of materials ranging between granular and pulverulent form.

Figure 3:
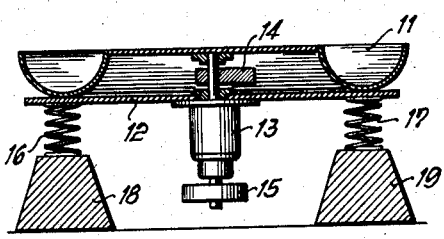
Figure 2:
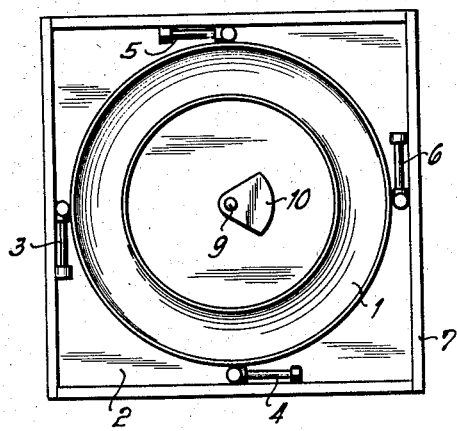
Figure 4:
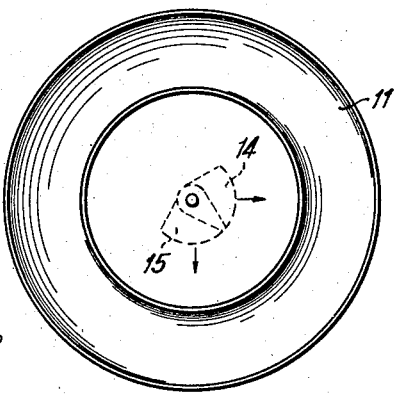
Figure 5:
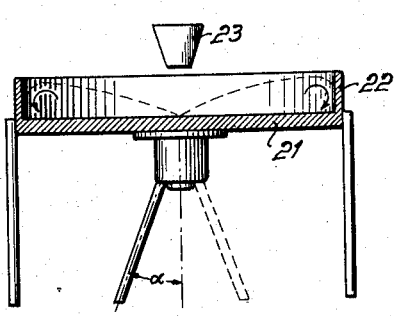
Figure 6:
Figure 7:
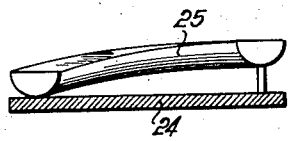

Some embodiments of the invention will now be described with reference to the accompanying drawing, in which Figs. 1 and 2 show in vertical section and in plan view respectively one form of apparatus;

Figs. 3 and 4 show in vertical section and in plan view a second form of apparatus, and Figs. 5, 6 and 7 show different forms of carrier for the material to be treated.

Referring to Figs. 1 and 2 the carrier for the material has the form of a complete circular trough 1 and is mounted on a frame 2, carried by supports 3, 4, 5, 6 projecting from a base 7. At the centre of the frame 2 there is provided the operating motor 8 for an out-of-balance weight 10 mounted on the shaft 9 of the motor 8. The supports 3–6 are substantially rigid in the direction from their anchorage to the base 7 to their attachment to the frame 2, but they are capable of deflection perpendicularly to said direction, preferably tangentially to the annular trough 1. The supports 3–6 are furthermore inclined at an angle α to the vertical. The rotary unbalance vibration generating means 8, 9, 10 accordingly produces a translatory or oscillatory motion in a substantially horizontal medium plane of the annular trough 1, superposed upon which is a tumbling or wobbling movement, in consequence of the mounting of the trough on the supports 3–6. The extent of the tumbling movement is determined ssubstantially by the angle α. It has been found that upon this movement the material in the annular trough 1 carries out a rolling motion which, in the embodiment illustrated, takes place in the left hand part of the trough from the outside bottom portion towards the top centre, whilst in the right hand part of the trough it is vice versa. Superimposed upon this rolling motion is a forward movement of the material in the annular trough.

Another apparatus for carrying out the method according to the invention is illustrated in Figs. 3 and 4.

Material to be treated is again carried in an annular trough, here designated 11, which is mounted on a supporting plate 12, wich carries a driving motor 13 for unbalanced weights 14, 15.

The plate 12 is supported on blocks 18, 19 by way of springs 16, 17, which are disposed symmetrically with respect to the central axis of the system. The out-of-balance weight 14 is arranged at least approximately in the centre of gravity of the vibrating parts of the apparatus, whilst the weight 15 is disposed at a lower level than this center of gravity.

Fig. 4 shows clearly the phase displacement of the two out-of-balance weights 14, 15, which in the present case amounts to 90°, but may vary between 0° and 180°.

The devices illustrated in Figures 1 to 4 operate as follows: The out-of-balance weights 10, 14 and 15, when subjected to rotation, set up unsymmetrical centrifugal forces tending to deflect the trough 11 and its support substantially horizontally. The deflection can take place because the trough 11 is resiliently mounted rather than rigidly on the ground. The rotation of the out-of-balance weights causes the unsymmetrical centrifugal forces to rotate likewise. As a result of this, the above-mentioned deflection changes its direction and follows the rotation of the centrifugal forces.

The resilient mounting means limit the deflection due to reactional forces set up therein. These reactional forces are not aligned with the asymmetrical centrifugal forces. Thus, these combined forces result in a torque momentum tending to tilt the trough 11, whereby the tilting movement is limited by the stiffness of the resilient mounting means securing the trough to the ground. As the tilting direction is changed during each rotation, a wobbling motion is produced. It will be understood that, for example in the embodiment shown in Figure 3, the motor 13, the weights 14 and 15 and the plate 12 constitute an agitating means acting substantially horizontally. This agitating means is adapted to produce a composite movement in cooperation with the springs 16 and 17, said movement comprising a substantially oscillatory component and a wobbling component.

In the apparatus of Figs. 1 and 2 variations in the tumbling movement may be achieved by varying the angle α, whilst in the apparatus of Figs. 3 and 4 the same result may be obtained by varying the phase shift angle between the out-of-balance weights 14 and 15.

Fig. 5 shows an arrangement in which the carrier for the material is the form of a circular plate 21 with a side wall 22. This arrangement is preferably employed when the material is not fed continuously, but a certain quantity is to be subjected in each case to a certain treatment. In this embodiment the material being treated wanders as far as the outer confines of the plate 21, and is turned over in the direction of the arrows.

If the side wall 22 is omitted, the material fed to the plate 21, for example through a hopper 23 at the centre, has a spiral motion imparted thereto in the direction towards the edge of the plate, which it then leaves. The ratio between the tangential and the radial speeds, and accordingly the nature of the resulting spiral movement, depends on the size of the angle α. It is accordingly possible to vary the period for which the material remains on the plate, or the rate of the rolling movement of the particles of material on the plate 21, within wide limits.

The present arrangement is suitable, for example, with omission of the side wall 22, as a bunker closure means. Granular material, for example, passes out through the outlet 23 and moves away laterally over the vibratory plate 21, whence it may be passed to an adjoining annular or spiral trough conveyor, which is associated with the plate 21, and in which the material (if desired also undergoing a rolling motion) is passed to a separating plate, where it leaves the conveying means.

An even better rolling motion is obtained if the carrier for the material, in accordance with Fig. 6, is made trough-shaped so as to have cross-section approaching semi-circular. In this way particles are given a rolling motion so as to pass downwards at the edge and upwards in the middle.

A further possible form of carrier for the material is illustrated in Fig. 7. In this construction there is provided on the bearing plate 24, which is caused to vibrate by means of the out-of-balance generating means and is carried by supports (not shown) a spirally formed trough, in which the material wanders upwardly or downwardly with a continuous rolling motion if desired. If the trough 25 is arranged helically the material moves upwardly or downwardly and at the same time along the trough from the inside towards the outside.

In the apparatus according to the invention it is possible by means of an additional factor to act on the undulatory form of the material, by selecting accordingly the thickness of the layer of material supplied. It has been found that, particularly when a considerable thickness of layer is selected, a rolling motion occurs which becomes flatter and flatter as the movement of the layer decreases, and in the case of thin layers finally develops into an outwardly directed spiral motion.

The invention is naturally not limited to the embodiments described above in detail with reference to the drawings, and numerous modifications of such embodiments are possible within the scope of the claims.

What we claim is:

1. An apparatus for treating granular and pulverulent materials comprising a substantially horizontal carrier for said materials, resilient mounting means for said carrier and agitating means on said carrier acting substantially in a horizontal plane and cooperating with said resilient mounting means to subject said carrier to a combined motion composed of an oscillatory component acting in a substantially horizontal plane of said carrier and a wobbling component by which said plane of said carrier is angularly displaced with respect to its substantially horizontal rest position.

2. Apparatus as claimed in claim 1, wherein the carrier has the form of a circular plate.

3. Apparatus as claimed in claim 1, wherein the carrier has a rounded cross-sectional channel-like form.

4. Apparatus as claimed in claim 1, wherein the carrier provides a spiral channel.

5. Apparatus as claimed in claim 1, comprising means for feeding the material centrally to the carrier from above.

6. An apparatus according to claim 1, wherein said carrier is mounted on the upper ends of a plurality of supporting members, the lower ends of which are fixed, and wherein said supporting members are resilient and disposed in such a manner that they are alternately and periodically deflected in a direction substantially vertical to the axes of said supporting members under the action of said vibration generating means to produce said wobbling component.

7. An apparatus for treating granular and pulverulent materials comprising a substantially horizontal carrier for said materials, resilient mounting means supporting said carrier, and means on said carrier adapted to generate an unsymmetrical centrifugal force rotating in a substantially horizontal plane which is different from any plane through the points where the action and reaction due to rotation between said carrier and said resilient mounting means occurs, said resilient mounting means being adapted to react resiliently independent of the direction of said centrifugal force.

8. An apparatus for treating granular and pulverulent materials comprising a substantially horizontal carrier for said materials, driving means attached to said carrier and having a substantially vertical driving shaft, an out-of-balance weight mounted on said shaft substantially in a plane through the center of gravity of said carrier and said driving means, and mounting means for said carrier secured to said carrier at points within a plane below said center of gravity, said mounting means being resilient in all directions.

9. An apparatus according to claim 8, wherein a second out-of-balance weight is mounted on said driving shaft remote from said center of gravity.

10. An apparatus according to claim 9, wherein one of said out-of-balance weights is disposed closer to the center of gravity of the vibrating parts of the apparatus than the other weight.

11. An apparatus for treating granular and pulverulent materials comprising a carrier having a preferred extension in one plane, means attached to said carrier and adapted to generate an asymmetrical centrifugal force rotating about an axis perpendicular with respect to said plane, and mounting means supporting said carrier and adapted to react resiliently in all directions, said centrifugal force together with the forces reacting in said mounting means between the latter and said carrier resulting in a torque moment rotating about said axis.

References Cited in the file of this patent
UNITED STATES PATENTS

| | | |
|---|---|---|
| 1,242,824 | Lindsay | Oct. 9, 1917 |
| 2,222,776 | Linke et al. | Nov. 26, 1940 |
| 2,255,799 | Meinzer | Sept. 16, 1941 |
| 2,610,040 | Emmons | Sept. 9, 1952 |

FOREIGN PATENTS

| | | |
|---|---|---|
| 358,449 | Great Britain | Apr. 10, 1929 |
| 720,709 | Great Britain | Dec. 22, 1954 |